Jan. 25, 1966 D. B. DEEN ETAL 3,231,246
MIXING APPARATUS FOR ATTACHMENT TO TRACTORS
Filed March 13, 1964 2 Sheets-Sheet 1

Darrell B. Deen
Douglas C. Friedland
John F. Roost
INVENTORS.

BY
*Seafield, Kokjer, Seafield & Lowe*
ATTORNEYS.

Darrel B. Deen
Douglas C. Friedland
John F. Roost
INVENTORS.

BY
ATTORNEYS.

3,231,246
MIXING APPARATUS FOR ATTACHMENT TO TRACTORS
Darrell B. Deen, Whiting, and Douglas C. Friedland and John F. Roost, Sioux City, Iowa, assignors to American Equipment Corporation, Sioux City, Iowa, a corporation of Iowa
Filed Mar. 13, 1964, Ser. No. 351,756
8 Claims. (Cl. 259—17.7)

This invention relates generally to apparatus for mixing concrete and the like and deals more particularly with apparatus of this type capable of being conveniently mounted on and operated from tractors and similar vehicles.

One of the principal objects of the invention is to provide a concrete mixing apparatus which is especially adapted to and suitable for the mounting thereof on a conventional farm tractor of the type having a three point rear hitch of the "Ferguson" type, a hydraulic pump and a rear power take-off shaft, and which is so constructed that the mixing drum can be rotated continuously during dumping or emptying of the contents of the drum. We are aware that there have been proposed and in fact are on the market, tractor mountable mixing devices which are powered from the power take-off of the tractor. However, to our knowledge, none provides a simple and effective means of maintaining rotation of the drum through all phases of the operation, from loading through mixing and dumping to clean out. It is one of the important features of our invention that apparatus constructed in accordance therewith is capable of such operation and moreover, that it is obtained in a manner which requires no complex gear trains, drum pivot bearings or the heavy duty support frames which have been of necessity incorporated in tilting drum mixers in the past.

Another important object of the invention is to provide a mixing apparatus of the character described in which the direction of rotation of the drum can be changed as desired thus to facilitate and ease the loading by left or right handed individuals. As is known, in most cases loading of small batch type mixers with cement and aggregate, and sometimes even water, is performed with a shovel or spade. A left handed person ordinarily finds it easier to swing the shovel oppositely from the swing of a right handed person. In loading mixers while they are rotating, the natural throw is against the direction of rotation of the drum, there is much undesirable splashing out of the open end of the drum or, alternatively, the operator is hampered by awkward shovel work. The present invention provides a structure which, through a simple and rapid adjustment, permits the operator to choose the most suitable direction of rotation for his particular method of materials handling.

Still another object of the invention is to provide a mixing apparatus which is capable of being mounted to the tractor by utilizing only the hitch points and arms of the conventional three point hitch. Our structure is such that no additional braces to the tractor chassis are needed. Consequently, apparatus constructed in accordance with the invention can be attached and detached with ease and rapidity. A companion feature of the invention in this respect is to provide apparatus which includes means for supporting it on the ground during attachment to and detachment from the tractor so that hitch points on the apparatus are sufficiently elevated as to be matched in height with corresponding hitch points on the tractor. As will be seen, this aids greatly in attachment and detachment of the apparatus, making it possible for one man to do the job with ease and facility. We have found that either can be accomplished with our preferred structure in well under one minute.

Further objects of the invention are to provide mixing apparatus of the character described in which the rotary drive to the drum is steady, slow and non-slipping; in which maintenance and repair, if necessary, are simple matters; in which the overall center of gravity of the apparatus is located closer to the rear tractor axle than in other units of which we are aware; which can be constructed at comparatively low cost; and which is sufficiently rugged in construction as to withstand long use.

Other and further objects of the invention, together with the features of novelty appurtenant thereto, will appear in the course of the following description.

In the accompanying drawings, which form a part of the specification and are to be read in conjunction therewith, and in which like reference numerals indicate like parts in the various views.

Figure 1:
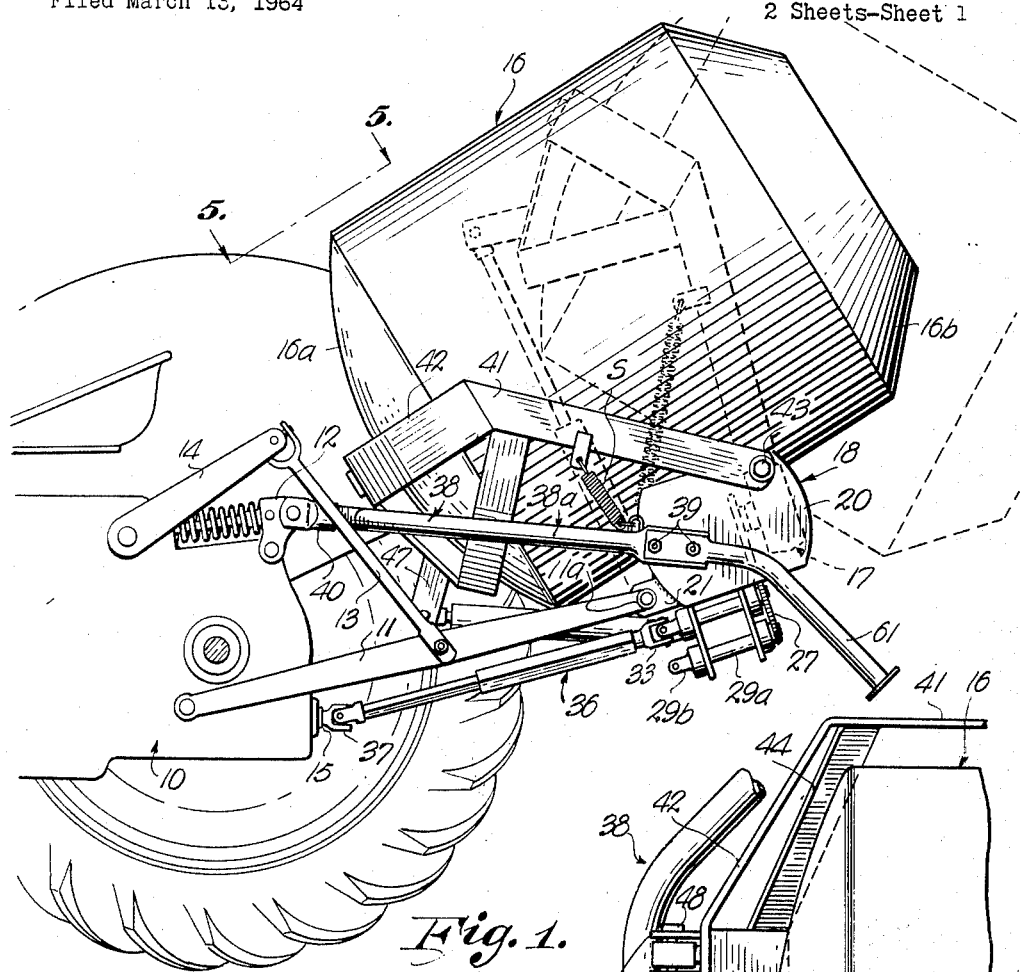
FIG. 1 is a side elevational view of a preferred embodiment of the invention showing also the rear portion of the tractor with the rear wheel and fender removed.

Referring now to the drawing, reference numeral 10 indicates the rear chassis and axle portion of a typical farm tractor equipped with a three point "Ferguson" type hitch. It will be understood that such a hitch includes a pair of laterally spaced hitch arms 11 (only the rear one of which may be seen in FIG. 1) and a central hitch connector 12. Each hitch arm has connected therewith a link 13 which in turn is connected with a pivotal lift arm 14. The arms 14 are actuated by a hydraulic system and control which is built in and forms part of the tractor. The tractor is also provided with rear power take-off shaft 15 and a valve controlled hydraulic fluid outlet (not shown). Such hitch construction, power take-off and pressurized fluid supply outlets are well known as being part of currently available tractors and since the details are not a part of the invention, no further description or showing is believed necessary.

Figure 3:
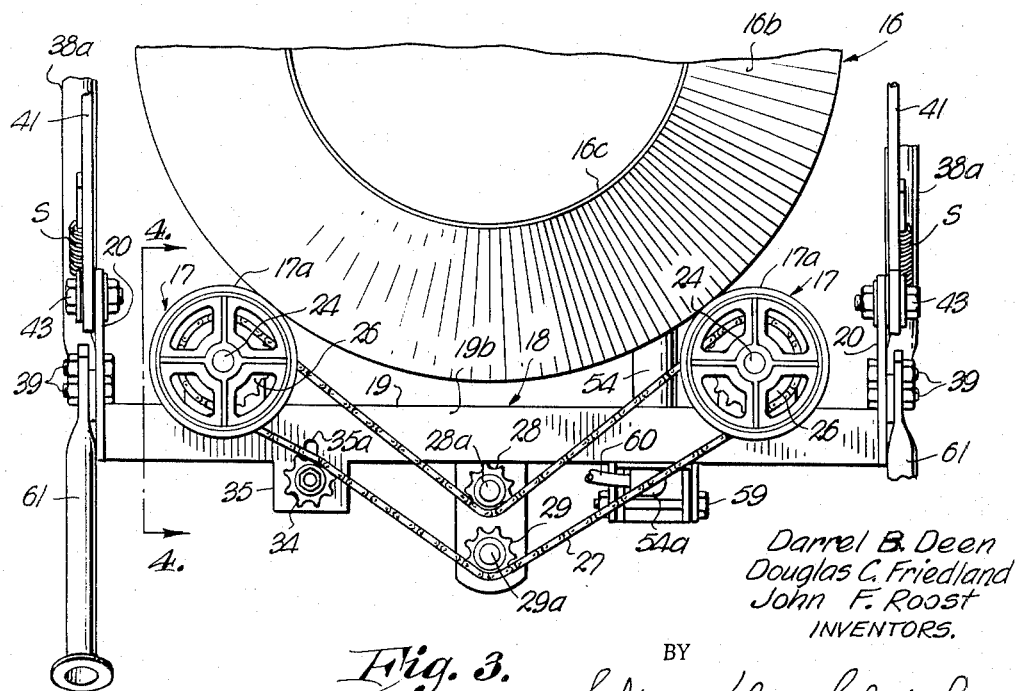
FIG. 3 is an enlarged fragmentary, somewhat schematic end elevational view of the drum, underlying support structure and drive members, the view being taken from the rearward end of the apparatus in the position of FIG. 1 and generally looking parallel with the axis of the drum.

The main component of our mixing apparatus comprises the hollow, generally cylindrical walled mixing drum 16 having the dome-like forward end wall 16a. The rearward portion of the drum may be tapered as at 16b and is provided with a loading and dumping opening 16c (FIG. 3). The interior cylindrical wall surface of the drum ordinarily is provided with mixing baffles or blades (not shown) and for reasons which will subsequently appear, these may be straight, i.e., parallel with the drum axis rather than of the conventional spiral configuration.

The central portion of the drum is supported by cradling it on and between a pair of wheel-like drive members 17 (FIGS. 1, 3 and 4) which in turn are carried with their axes in spaced paralled relationship on a generally horizontal support structure 18 extending transversely under the drum. In order to provide good traction with the drum walls, the wheel members 17 are provided with a rubber or other elastomeric rim surface or covering 17a. As shown particularly in FIG. 4, preferably each rim is circumferentially ridged toward the axial mid-point thereof.

The support structure 18 comprises, in the preferred embodiment, a downwardly open channel member 19 having the forwardly and rearwardly depending leg portions 19a and 19b, respectively. The ends of the channel member on opposite sides of the drum have secured thereto, as by welding upright parallel side plates 20.

Figure 4:
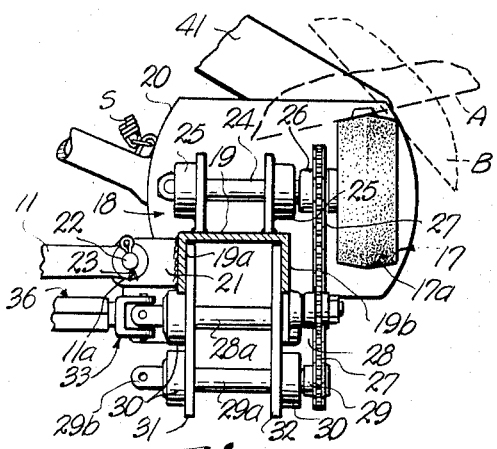
FIG. 4 is a sectional view taken along line 4—4 of FIG. 3 in the direction of the arrows, the drum wall being represented schematically in broken lines in two positions thereof.

Secured to and projecting forwardly of the front leg 19a of the channel 19 and slightly inboard of each side plate is one of a pair of lugs 21. Each lug is apertured to receive therein a hitch pin 22 for securing the end of a hitch arm 11 thereto. It will be understood that there is a pair of such lugs, one for each hitch arm. Preferably the hitch pins are secured to the lugs, the connection with the hitch arms being made by slipping the apertured outer end 11a over the pin and retaining it on the pin by a cotter pin or key 23 (FIG. 4). There is sufficient lateral play available in the hitch arms to permit this mode of assembly.

Each drive member 17 is carried at the rearward end of an axle or shaft 24 which in turn is journaled in fore and aft bearings 25 supported from and secured to the top web of the channel 19 by suitable connector members. A sprocket 26 is keyed to each shaft. The drive members are drivingly interconnected by an endless chain 27 trained around the sprockets. The central portions of the upper and lower flights of the chain 27 pass under and are drivingly engaged with upper and lower sprockets 28 and 29, respectively. In order to provide speed reduction, the sprockets 26 on the drive member shafts are made larger in diameter than the central sprockets 28 and 29.

The sprockets 28 and 29 are carried on axles or shafts 28a, 29a which are journaled in corresponding sets of axially spaced bearings 30. The bearings 30 are in turn secured to front and rear plate members 31, 32 secured to and depending from the channel member 19. Each shaft has a forwardly projecting stub portion, as illustrated in FIG. 4 at 29b, which is adapted to have fitted thereto one half of a universal joint 33. The stub portion of shaft 28a is not seen in FIG. 4, since it is coupled with and concealed by the universal joint. However, it will be evident that the universal joint may be coupled with either shaft. The main drive chain 27 may also be engaged with suitable tighteners and idlers as, for example, with the idler sprocket 34 journaled on an ear 35 depending from and secured to the rear channel leg 19b. Sprocket 34 is mounted for vertical adjustment in slot 35a.

The universal joint 33 is mounted at the rearward end of a splined, telescopically extendible and retractable drive shaft 36. The other end of shaft 36 carries a second universal joint 37 which is adapted to be coupled with the power take-off shaft 15 of the tractor.

The support structure 18 is connected with the central hitch point 12 of the tractor by a U-shaped member 38 having the side legs 38a. The legs 38a are flattened at the rearward ends and are bolted by bolts 39 to the respective side plates 20. The central portion 38b of member 38 extends across the front of the drum and has secured centrally thereto, by a threadedly adjustable connection, a forwardly extending apertured tab or lug 40. This lug is adapted to be secured by a cross pin through the hitch 12. It is provided with the thread adjustment and plurality of apertures so as to permit adaptation to tractors of differing manufacture.

Figure 5:
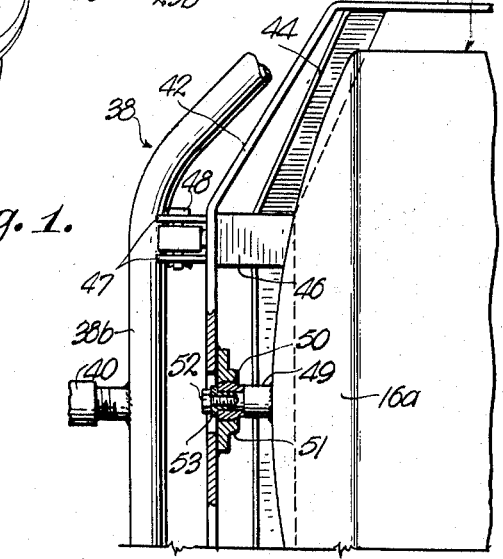
FIG. 5 is a fragmentary view taken generally along line 5—5 of FIG. 1, parts broken away and shown in section for purposes of illustration.

The forward end of the mixing drum 16 is supported by a frame structure which includes a pair of flat, slightly upwardly inclined side arms 41 which are located on opposite sides of the drum from one another and are bridged at their forward end by a bowed connecting member 42 (FIG. 5) which passes across the center of the forward wall 16a of the drum. Each arm 41 is pivoted at its rearward end by a bolt 43 to the corresponding side plate 20. A second bow section 44 passes across the front of the drum below the bow 42 and is secured at its ends to the under edge of side arms 41 as at 45 (see FIG. 2). A base strap 46 extends between and is welded to the respective bows and as is best seen in FIG. 5, the base strap is offset substantially to one side of the center line of the drum. A clevis-like pivot bracket is provided on the front of the upper bow 42 at the location of strap 46 by forwardly projecting ears 47 which are provided with aligned apertures to receive a pivot pin 48. More will be said of this later. Springs S on the opposite sides of the apparatus serve to bias the frame structure toward the solid line position of FIG. 1. In this position, the incurved sides of the second bow section 44 engage and seat upon the corresponding sides 38a of the U-shaped hitching member 38.

The forward wall of the drum is interconnected with the upper bow section 42 of the frame structure by means of a thrust bearing best seen in FIG. 5. As can be seen in this figure, extending forwardly on the center line of the drum from the front wall 16a is a stub axle 49 having a reduced diameter portion at the outer end thereof. The reduced diameter portion is received through an appropriate passageway formed in a ball element 50 which is mated with and in a spherically curved socket formed in a bearing plate 51. Bearing plate 51 is welded or otherwise firmly secured to the inside face of the bow section 42. Threaded into an appropriately tapped counter bore in the reduced diameter portion of shaft 49 is a cap screw 52. A washer 53 is interposed between the head of the cap screw 52 and the ball member 50 and serves to hold the axle in place in the ball member. Obviously the drum can rotate freely in the bearing thus provided but is prevented from pulling rearwardly therefrom by the cooperation between the surfaces of the ball member and socket. The center section of the bow portion 42 is appropriately apertured to receive the bolt 52 and washer 53.

Figure 2:
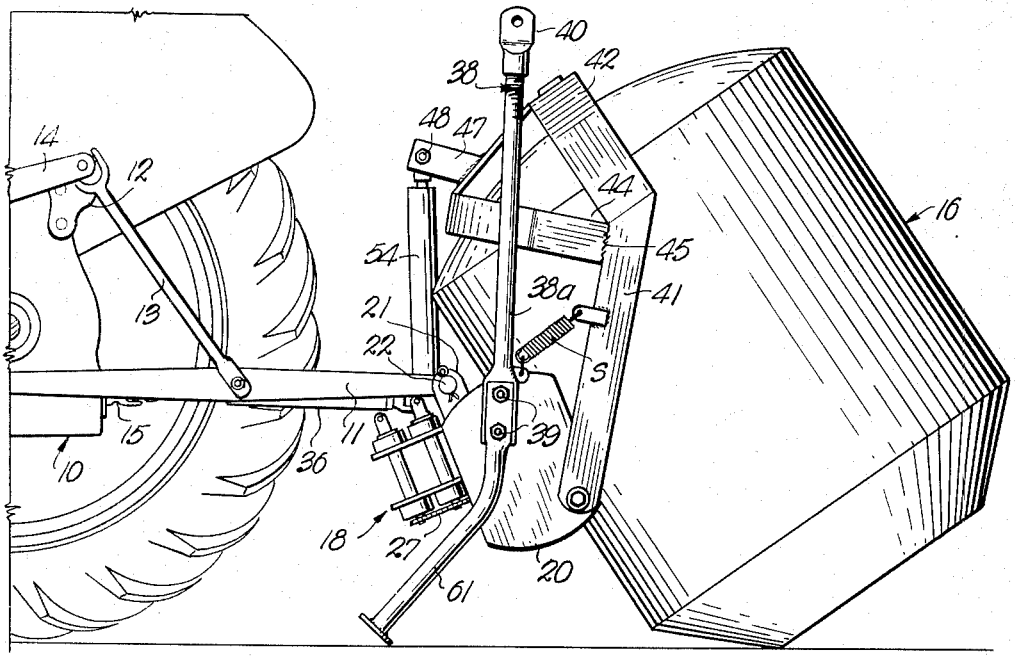
FIG. 2 is a view similar to FIG. 1 but illustrating the ground rested position from the mixing apparatus during attachment to and detachment from the tractor.

As is perhaps best seen by referring to FIGS. 2 and 3, extending forwardly from the support structure 18 to connect with the bracket formed by ears 47 is a single acting hydraulic cylinder assembly 54. The pin 48 pivotally connects the end of the piston with the bracket members 47. The other end of the cylinder is connected by a pivot bracket including pin 59 to the under side of the channel member 19. The rearward end of the cylinder is provided with an elbow 54a to which is connected a flexible hydraulic line represented at 60. While this line is not shown in its entirety, it will be understood that it is long enough to reach to the conventional hydraulic fluid supply outlet on the tractor and, in the operation of the machine, is connected therewith.

Turning now to a description of the manner of operation of the preferred embodiment of the invention, it perhaps will be best to start with the apparatus in the preliminary attaching position of FIG. 2. It will be noted that the apparatus is provided with a pair of leg members 61 which are respectively attached at their flattened end portions to the side plates 20 by bolts 39, these being the same bolts which secure the side legs 38a of U-shaped member 38 to the side plates. The legs extend in such a direction and for such length as to provide lateral support for the apparatus when it is positioned with the rearward end of the drum resting on the ground in the position of FIG. 2. The apparatus is stable in this position. In order to attach the unit to the tractor, the tractor need only be backed up to bring the hitch links 11 into registry with the hitch brackets 21 on the mixing apparatus, at which time the hitch pins can be inserted as earlier described. The drum can then be tilted forward, using hitch pins 22 as a pivot, to bring the connecting lug 40 into registry with the hitch member 12 so that the connection there can be made. The hitch links 11 can be raised and lowered as necessary to complete the connection.

Prior to tilting the mixing apparatus to the operative position and connecting lug 40 with hitch point 12, the drive shaft 36 should be connected with its respective driving and driven shafts 15 and 28a. The spined telescopic construction of the shaft permits the necessary changes in length during the final installation step. To complete the machine for operation, the hydraulic hose 60 is connected with the tractor pressurized fluid supply outlet.

The normal loading and mixing position for the drum 16 is shown in solid lines in FIG. 1. The orientation of the drum with respect to drive wheels 17 while the drum is in the normal operating position is represented by the broken line segment A of FIG. 4. As can be seen, the drum rests upon the rims of the drive wheels 17. The forward tilting of the drum is limited by interengagement between surfaces on the lower bow section 44 and the side arms 38a of the U-shaped hitch member 38, as earlier described. This position corresponds with the retracted position for the hydraulic cylinder 54.

The drum is rotated on its axis by the drive members 17. Power is transmitted to the drive members through the drive shaft 36 and sprocket shaft 28a. The sprocket 28, which is mounted on the latter shaft, drivingly engages the chain 27, thus rotating the drive members 17 in the same direction. Since the drive members frictionally engage the drum wall, the drum is turned continuously.

Whenever it is desired to shift the drum to the dumping position (which is represented by the broken lines in FIG. 1), hydraulic fluid is supplied through line 60 to the hydraulic cylinder 54 thus to extend the piston thereof. The piston, being connected with bracket 47 on the frame, applies a clockwise moment (viewed as in FIG. 1) to the pivotal frame structure supporting the forward end of the drum, and causes it to turn about the axis defined by the pivot pins 43. The piston acts against the resistance of the springs S which interconnect the frame sides 41 with the stationary rear support structure.

As will be evident, during pivoting the drum it continues to rest upon and engage the rims of the drive members 17 and consequently, it will be continuously rotated during the tilting movement and when it arrives at the full limit of extension for the piston of the hydraulic cylinder. The broken line segment marked B in FIG. 4 is a schematic representation of the position of the drum with respect to the drive members during dumping. The thrust bearing interconnecting the forward wall of the drum and the forward bow section 42 of the frame prevents the drum from sliding longitudinally while permitting rotation about the drum axis.

Since the drum can be maintained in rotation while it is in its dumping or discharging position, the flow from the drum can be evenly controlled. In other words there will be no surges or gaps in the discharge. Moreover, it will be evident that the inclination of the drum can be controlled by the degree of extension of the hydraulic cylinder. This assures that discharge at a desirable flow rate, whether it be slow or rapid, can be obtained.

To return the drum to the normal position, the fluid pressure is removed and fluid is permitted to bleed from the cylinder 54. The springs S will operate to return the drum to the normal position. However the cylinder will act to maintain a controlled rate of return so that there is not too great an impact between the limit surfaces earlier described when the drum returns to the full forward position.

It will be noted that the common axis defined by pivot pins 43 substantially coincides with the mean or average point of engagement of the drum surfaces with the rims of the drive members 17. By providing this arrangement, a minimum of angular movement between shaft 49 and the forward bow section 42 of the forward support frame occurs. Any disparity between the pivot axis defined by pins 43 and the points of engagement of the drum with the drive members is, however, compensated for by the ball connection 50 between the drum and frame member 42 since a limited degree of universal angular movement is possible.

Should it become desirable to drive the drum in the opposite direction from that resulting when the shaft 36 is connected with the upper sprocket shaft 20a, one need only disconnect the universal joint 32 from shaft 28a and reconnect it with the stub projection 29b of the lower shaft 29a. Sprocket 29 will then be the driving sprocket and since the flights of the chain are arranged to pass under each sprocket, the direction of drive will be opposite that obtained in the former case.

To disassemble the apparatus from the tractor, one need only disconnect member 38 from the hitch 12 and permit the drum and its support elements to tilt backwardly to the FIG. 2 position. The hitch arms 11 can then be disconnected from the hitch pins 22 as earlier described and the tractor driven off. The leg 61 serves to support the drum in convenient position for disassembly of the arms 11. The apparatus is positioned for quick reassembly with the tractor in the manner earlier described.

From the foregoing description it will be seen that this invention is one well adapted to attain all of the ends and objects hereinabove set forth together with other advantages which are obvious and which are inherent in the structure.

It will be understood that certain features and subcombinations are of utility and may be employed without reference to other features and subcombinations. This is contemplated by and is within the scope of the claim.

Since many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A concrete mixing apparatus for attachment to a tractor having rear hitch members and a power take-off shaft, said apparatus comprising a support structure adapted to be secured to said members, a pair of wheel members mounted on said structure, said wheel members having spaced parallel axes, a concrete mixing drum having a central barrel-like surface, said drum supported intermediate the ends of said barrel-like surface by resting same on the wheel members in cradled relationship with the axis of the drum in a vertical plane located between the axes of the respective wheel members, extensible and retractable thrust means operably connected with said drum to pivot said drum on said wheel members between mixing and dumping positions, and power transmission means drivingly for connecting said power take-off shaft with at least one of said wheel members whereby to maintain a frictional drive through said one wheel member to said drum in said mixing and dumping positions.

2. A concrete mixing apparatus for attachment to a tractor having rear hitch members and a power take-off shaft, said apparatus comprising a support frame adapted to be secured to said hitch members, at least one wheel member carried by said frame and positioned with its axis of rotation generally fore and aft with respect to the tractor, a concrete mixing drum having a zone of circular cross-section at a location intermediate the ends of the drum, the axis of said drum also extending fore and aft with respect to the tractor, the drum being supported on said wheel member with a point in said zone contacting the rim of the wheel member, extensible and retractable thrust means operably connected with said drum to pivot said drum on said wheel member between mixing and dumping positions, and power transmission means drivingly connecting said power take-off with said wheel member whereby to maintain a frictional drive through said wheel member to the drum for rotating same in said mixing and dumping positions.

3. A concrete mixing apparatus for attachment to a tractor having rear hitch members and a power take-off shaft, said apparatus comprising a support structure adapted to be secured to said hitch members, a pair of laterally spaced rotary friction drive wheels mounted on said frame and having their axes disposed generally fore and aft with respect to the tractor, a hollow concrete mixing drum having a centrally located zone of circular cross-section, said drum cradled on said wheel members with circumferentially separated points in said zone in engagement with points on the rims of said wheel members, pivotal frame means interconnecting said support structure and drum and operable to permit rotation of the drum about its own axis while preventing longitudinal sliding movement thereof on the wheel members, selectively extensible and retractable means connecting said support structure and frame means and operable to rock said drum on said drive members, and transmission means for drivingly connecting at least one of said wheel members with said power take-off shaft.

4. A concrete mixing apparatus for attachment to a tractor having rear hitch members and a source of power, said apparatus comprising a hollow mixing drum having a closed front end and open rearward end, a support structure underlying and extending transversely with respect to said drum, a pair of rotary drive members carried by said support structure and having their axes running fore and aft with respect to the drum and in spaced parallel relationship, circumferentially spaced points on the lower half of the wall surface of the drum resting on points on the rims of said drive members, a frame structure pivotally connected to said support structure for movement about an axis disposed transversely with respect to the drum, said frame structure extending forwardly from said support structure, connecting means connecting said drum with said frame structure for rotation of the drum about its own axis with respect thereto, means for rocking said frame structure on its pivot axis thus to rock said drum on its drive members, and means for transmitting power from said source to said drive members whereby to rotate the drum.

5. A concrete mixing apparatus for attachment to a tractor, said apparatus comprising a generally horizontal support structure, a pair of laterally spaced drive members having circular rim portions and journalled on said support structure with their axes transverse to the lengthwise direction of said support structure, a hollow mixing drum disposed above said support structure with its axis in a vertical plane located between the respective axes of the drive members and with points on its outside surface in frictional engagement with points on said rim portions of the drive members, a frame structure connected with said support structure and swingable between first and second limit positions thereof, connector means connecting said drum to said frame structure and journaling the drum with respect thereto for rotation about its own axis, and means for selectively shifting said frame structure between said first and second positions and thus rocking said drum so that its axis moves in said plane.

6. Apparatus as in claim 5 including resiliently yieldable means interconnecting said frame structure and support structure and biasing said frame structure toward one of said limit positions.

7. Apparatus as in claim 5 including power transmission means drivingly interconnecting said drive members.

8. Apparatus as in claim 5 wherein said connector means includes a joint limited universal movement of the drum axis with respect to the frame structure.

References Cited by the Examiner
UNITED STATES PATENTS 2,656,164  10/1953  Knowlton _____ 259—177

WALTER A. SCHEEL, *Primary Examiner.*

CHARLES A. WILLMUTH, *Examiner.*